(12) United States Patent
Enomoto

(10) Patent No.: US 9,777,612 B2
(45) Date of Patent: Oct. 3, 2017

(54) DEPOSIT DETECTION DEVICE FOR EXHAUST PUMP AND EXHAUST PUMP

(71) Applicant: Edwards Japan Limited, Yachiyo-Shi, Chiba (JP)

(72) Inventor: Yoshihiro Enomoto, Narashino (JP)

(73) Assignee: Edwards Japan Limited, Chiba (JP)

( * ) Notice: Subject to any disclaimer, the term of this patent is extended or adjusted under 35 U.S.C. 154(b) by 183 days.

(21) Appl. No.: 14/394,668

(22) PCT Filed: Mar. 7, 2013

(86) PCT No.: PCT/JP2013/056246
§ 371 (c)(1),
(2) Date: Oct. 15, 2014

(87) PCT Pub. No.: WO2013/161399
PCT Pub. Date: Oct. 31, 2013

(65) Prior Publication Data
US 2015/0114101 A1    Apr. 30, 2015

(30) Foreign Application Priority Data

Apr. 24, 2012  (JP) ................................ 2012-099214

(51) Int. Cl.
*F01N 11/00* (2006.01)
*F04D 27/00* (2006.01)
(Continued)

(52) U.S. Cl.
CPC .............. *F01N 11/00* (2013.01); *F04C 25/02* (2013.01); *F04D 19/042* (2013.01);
(Continued)

(58) Field of Classification Search
CPC ...... F04C 25/00; F04C 28/28; F04C 29/0014; F04C 29/0092; F04C 18/123;
(Continued)

(56) References Cited

U.S. PATENT DOCUMENTS 5,373,457 A * 12/1994 George ................ G09B 23/186
327/334
2007/0128047 A1* 6/2007 Gonnella .................. F04B 1/08
417/2

(Continued)

FOREIGN PATENT DOCUMENTS

JP    2003-232292    8/2003
JP    2004-117091    4/2004
WO   2011-145444 A1  11/2011

OTHER PUBLICATIONS

Translation of International Search Report mailed Jun. 11, 2013 in PCT/JP2013/056246, 1 page.

*Primary Examiner* — Natalie Huls
*Assistant Examiner* — Monica S Young
(74) *Attorney, Agent, or Firm* — Shumaker & Sieffert, P.A.

(57) ABSTRACT

A deposit detection device for an exhaust pump is provided, which can be easily put into operation without the burdens of, for example, installing equipment for flowing a gas, or adding or changing operation modes in apparatuses. The device is configured to include: a means for detecting motor current values a motor that rotates a rotating body; a current value storage portion that stores only motor current values that are equal to or greater than a preset value from among detected motor current values; an average value calculation portion that calculates an average value per unit time of the stored motor current values; an average value storage portion that stores the calculated average value; an approximation calculation portion that determines a linear approximation of the stored chronologically ordered average values; and a difference value calculation portion that determines a difference value between a predicted motor current value calculated by using the linear approximation and an initial motor current value at a start of use of the exhaust pump. A (Continued)

time when the difference value exceeds a predetermined threshold is determined as a time for maintenance of the exhaust pump.

10 Claims, 17 Drawing Sheets

(51) Int. Cl.
| | |
|---|---|
| *F04D 19/04* | (2006.01) |
| *F04C 25/02* | (2006.01) |
| *H02P 29/024* | (2016.01) |
| *F04C 28/28* | (2006.01) |

(52) U.S. Cl.
CPC ........ *F04D 27/001* (2013.01); *F01N 2550/00* (2013.01); *F04C 28/28* (2013.01); *F04C 2220/30* (2013.01); *F04C 2270/86* (2013.01); *F04C 2280/02* (2013.01); *H02P 29/027* (2013.01)

(58) Field of Classification Search
CPC .... F04C 18/126; F04C 18/16; F04C 2220/12; F04C 2270/80; F04C 2280/02
USPC ..................................................... 73/114.69
See application file for complete search history.

(56) References Cited

U.S. PATENT DOCUMENTS

| | | | |
|---|---|---|---|
| 2007/0172361 A1* | 7/2007 | Manson | F04C 25/00 417/53 |
| 2009/0035151 A1* | 2/2009 | Sugiura | F04B 51/00 417/44.11 |
| 2009/0281734 A1* | 11/2009 | Abbata | G05B 11/28 702/33 |

* cited by examiner

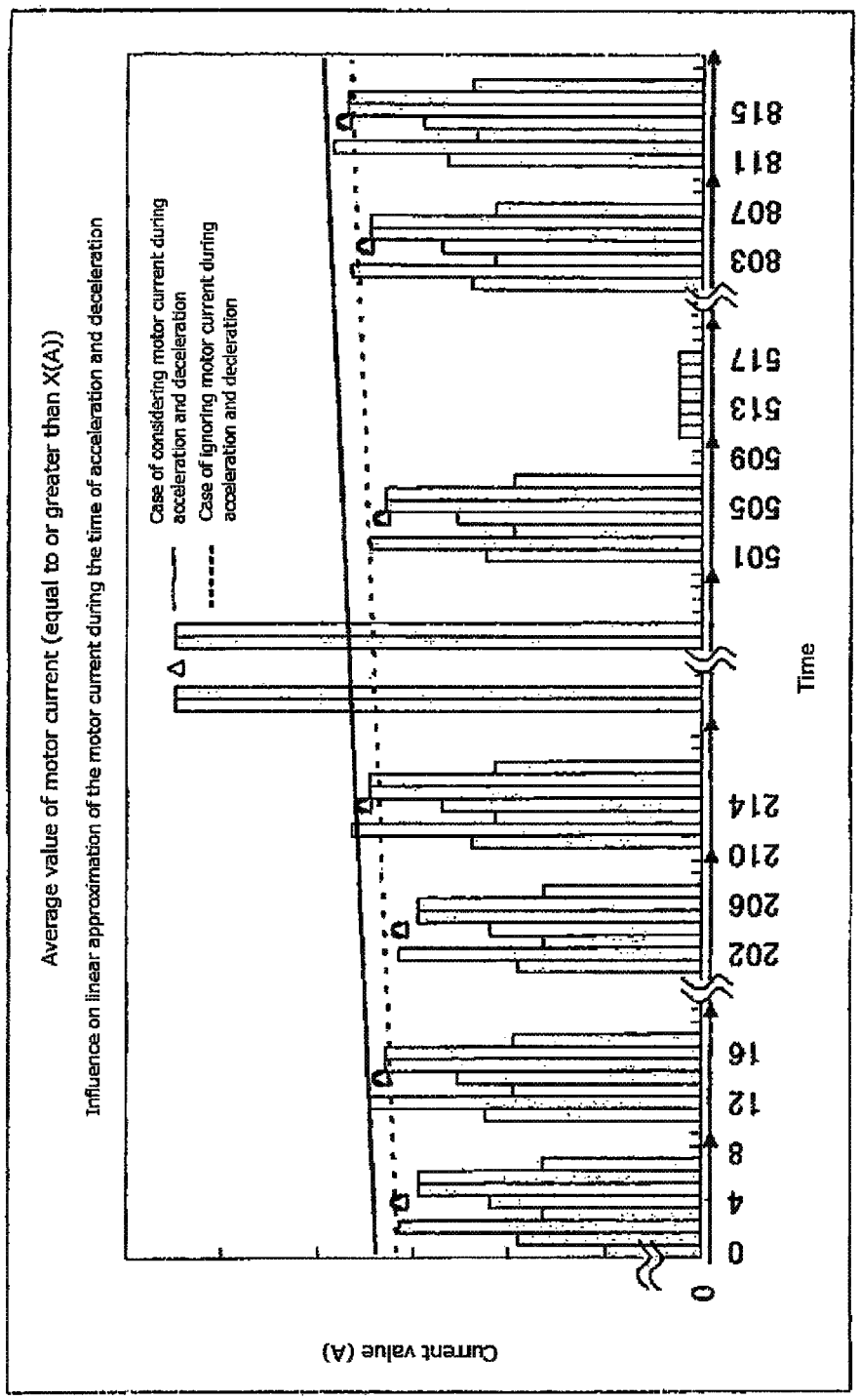
Fig. 7-A

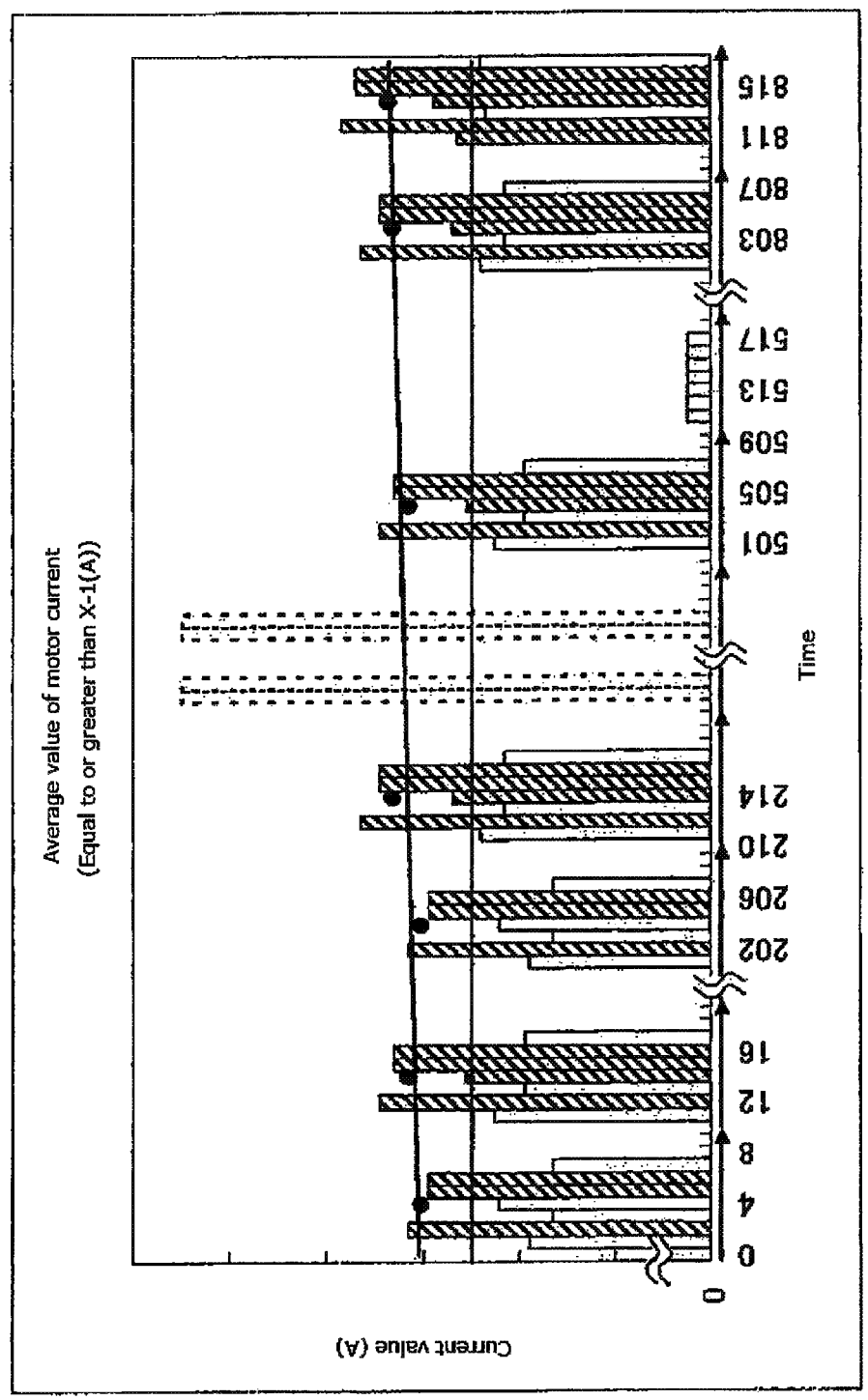
Fig. 7-B

Note 1) 1 scale of vertical axis is 2.0A

DEPOSIT DETECTION DEVICE FOR EXHAUST PUMP AND EXHAUST PUMP

This application is a national stage entry under 35 U.S.C. §371 of International Application No. PCT/JP2013/056246, filed Mar. 7, 2013, which claims the benefit of JP Application 2012-099214, filed Apr. 24, 2012. The entire contents of International Application No. PCT/JP2013/056246 and JP Application 2012-099214 are incorporated herein by reference.

TECHNICAL FIELD

The present invention relates to a deposit detection device for an exhaust pump and the exhaust pump, and more particularly to a deposit detection device for an exhaust pump for detecting a deposit inside an exhaust pump that is used in an etching process or the like to allow for estimation of a time for maintenance of the exhaust pump, and to the exhaust pump.

BACKGROUND

In a semiconductor production apparatus, an exhaust pump P such as the one shown in FIG. 8, for example, is used as a means for exhausting gas expelled from a processing apparatus such as an etching apparatus to the outside. This exhaust pump P has a rotating body R formed by a cylindrical part 1 and a blade part 2 and driven by a motor M to rotate around a rotor shaft 3.

Gas molecules present on an inlet port 4 side of the exhaust pump P are given a downward momentum by the rotating blade part 2 and conveyed to upstream of a threaded part 5, compressed there, and exhausted to the outside from an outlet port 6.

It is known that products deposit inside the exhaust pump such as a turbomolecular pump during such exhaustion of gas (see, for example, paragraph [0014] of Japanese Patent Application Laid-open No. 2003-232292). Products particularly tend to deposit in part S of a gas passage shown in FIG. 8.

Japanese Patent Application Laid-open No. 2003-232292 discloses a method of detecting products deposited inside a pump (referred to also as "internal deposit"). According to this detection method, motor current is detected as the motor rotates rotary blades of a turbomolecular pump, and the detected motor current is compared with a preset value. If, as a result of the comparison, the detected motor current is equal to or greater than a preset value, a notification is made that a time for maintenance has arrived (see paragraph [0022] and others in Japanese Patent Application Laid-open No. 2003-232292).

However, exhaust pumps including the turbomolecular pump of Japanese Patent Application Laid-open No. 2003-232292 are used in various processes by end users, i.e., pumps are used for a variety of gases and in various flow rates depending on the contents of processes. Therefore, the current value of the motor that rotates the rotating body of the exhaust pump variously changes in accordance with a type and flow rate of gas flowing through the exhaust pump.

With the deposit detection method mentioned above, the detection of product deposition is based on a preset current value, so that correct detection of deposits is impossible in a process to which the preset current value is not adapted.

In order to avoid erroneous detection or false alarms, the preset current value must be changed in accordance with conditions of use of the exhaust pump, which must be closely examined beforehand, such as what type of gas will be used in what flow rate in the process in which the exhaust pump is to be used, which is a time-consuming and costly task.

The applicant of the present invention has previously filed an application on a novel invention relating to detection of a deposit inside a pump, wherein an initial motor current and a current motor current are determined in an initial step and a later step, respectively, and an amount of change in the motor current relative to the initial value is determined, based on which deposition in the pump is detected, in order to correctly detect and alert to a deposit of products inside the exhaust pump used in a process, whatever process it may be, irrespective of the type or flow rate of the gas used in the process (see WO 2011/145444).

As shown herein, in the case with the exhaust pump P of FIG. 8, as products deposit in part S of the gas passage in a lower part of the cylindrical part 1, pressure in a lowermost part of the exhaust pump P below the blade part 2 increases. This increases the load on the motor M, so that the motor current is controlled to increase.

The present inventors conducted a test to investigate the relationship between product deposition and current changes in the motor M of the exhaust pump P by creating simulated conditions of product deposition in part S of the gas passage (see FIG. 9). The results confirmed that, as shown in FIG. 10, from a point of time when the thickness of the deposit inside the pump exceeds 50% of the gas passage cross-sectional area (see the diagram with a product deposition ratio of 50% in FIG. 9), the motor current increases drastically.

Accordingly, detection of such an amount of change in the motor current enables detection of a deposit inside the pump, or estimation of the deposit thickness to predict the time for maintenance of the exhaust pump.

Note, the thickness of the deposit in the pump with which the motor current starts to rise is not necessarily 50% in all machine types but varies depending on the design. Further, if, for example, the flow rate of the gas flowing through the exhaust pump P is low as in Operating Condition 1 (under which 800 sccm of gas B flows) of the exhaust pump P, motor current changes are small as shown in FIG. 10 and FIG. 11, because of which a significant determination of an increase in the motor current is not possible.

Moreover, the motor current changes also depending on individual pumps P, or the temperature in the pump, even if the flow rate of the gas is the same (see FIG. 12). Therefore, it is necessary to detect an increase (AI) in the motor current of at least 10% or more in order to significantly determine that there is an increase in the motor current.

However, in actuality, exhaust pumps are used in a variety of ways by end users, and the amount or flow rate of gas not only changes variously depending on each apparatus or formula, but also changes constantly during an operation with the same formula. Therefore, a precise detection of an amount of product deposition based only on a function of detecting that the motor current has exceeded a certain threshold is very difficult.

A method has been proposed, therefore, as a means for precisely detecting a state of product deposition, wherein, as shown in FIG. 13, a "health check mode" is provided, during which the type and flow rate of gas flowing through the exhaust pump are set constant.

SUMMARY

In reality, however, implementation of such a mode was hardly feasible because of the burdens of having to install equipment for flowing a gas to be used for the measurement, and to add or change operation modes in apparatuses, for each end user to execute this mode.

In view of the background art described above, there are technical problems to be solved in order to provide a readily feasible deposit detection device for exhaust pumps without the burdens of installing equipment for flowing a gas, or adding or changing operation modes in apparatuses, and an object of the present invention is to solve these problems.

As a means for solving the problems mentioned above, the applicant of the present invention proposes a method of estimating a degree of product deposition by monitoring motor current that flows during a process.

The present invention was proposed to achieve the above object and provides, as set forth in claim 1, a deposit detection device for an exhaust pump that exhausts gas by a rotating action of a rotating body, including: a means for detecting current values of a motor that rotates the rotating body; a current value storage portion that stores only motor current values that are equal to or greater than a preset value from among the motor current values during a normal operation mode; an average value calculation portion that calculates an average value per unit time of the motor current values stored in the current value storage portion; an average value storage portion that stores the average value calculated by the average value calculation portion; an approximation calculation portion that chronologically order storage current average values stored in the average value storage portion and determines a linear approximation of; and a difference value calculation portion that determines a difference value between a predicted motor current value calculated by using the linear approximation and an initial motor current value at a start of use of the exhaust pump. A time when the difference value exceeds a predetermined threshold is determined as a time for maintenance of the exhaust pump.

With this configuration, a difference value between a predicted motor current value calculated from a linear approximation of average values of motor current values that are equal to or greater than a preset value, and an initial motor current value of the exhaust pump, is determined. A time when this difference value exceeds the threshold is determined as a time for maintenance of the exhaust pump. In this way, according to the present invention, a degree of product deposition is predicted to automatically estimate a time for maintenance only by detecting a change in the motor current.

Motor current values that are equal to or greater than a preset value are stored in the current value storage portion only during the normal operation mode when normal currents flow in the motor, excluding a predetermined time period immediately after completion of an acceleration mode (including when the motor is accelerated again immediately after a brake mode). Therefore, motor currents during waiting, acceleration, and deceleration can be ignored.

According to the invention as set forth in claim 2, the deposit detection device for an exhaust pump according to claim 1 is provided, wherein the motor current values detected in the normal operation mode are obtained except during a period in which the motor current values once drops to sufficiently small values after completion of an acceleration mode of the exhaust pump.

With this configuration, data is collected except during a period of time for the motor current to drop to a sufficiently small value, so that storage of motor currents that are to be effective data is performed only when the motor current is stable during the normal operation mode of the exhaust pump.

According to the invention as set forth in claim 3, the deposit detection device for an exhaust pump according to claim 1 or 2 is provided, wherein the preset value of the motor current values is the largest possible value in a range that at least one data including a maximum value current value (peak current) of the motor current values can be acquired in each process of exhausting the gas.

With this configuration, since at least one motor current value is acquired for each process of exhaust gas processing, motor current values of all the processes can contribute to calculation of the average value.

According to the invention as set forth in claim 4, the deposit detection device for an exhaust pump according to any one of claims 1 to 3 is provided, wherein the threshold of the difference value between motor current values is determined in accordance with a state of product deposition in each exhaust pump.

With this configuration, the threshold for the difference value between motor current values is separately determined in consideration of the state of product deposition in each exhaust pump. Thus, even though the speed and the like of product deposition may differ in each exhaust pump, the threshold is set in accordance with the deposition speed and the like, and it is determined whether or not the difference value between motor current values exceeds this threshold.

According to the invention as set forth in claim 5, the exhaust pump including the deposit detection device for an exhaust pump according to any one of claims 1 to 4 is provided.

With this configuration, an exhaust pump having effects as set forth in claims 1 to 4 can be obtained.

With the invention as set forth in claim 1, the state of product deposition inside an exhaust pump can be determined to readily estimate a time for maintenance of the exhaust pump without the burdens of installing equipment for flowing a gas, or adding or changing operation modes in apparatuses.

Also, influence of a large current that would not flow during a normal process but could possibly flow can be minimized. A time for maintenance of the exhaust pump can readily be determined only by determining a linear approximation of average values of motor current values that are equal to or greater than a preset value, which provides the merit that the algorithm of calculating the average value is simple.

Furthermore, not only a largest current that flows in the motor driver during acceleration and deceleration can be ignored, but also currents during waiting or the like that are not effective as data can also be ignored. If the motor current does not exceed a preset value during waiting or the like, individual currents are not used as data for calculation of an average value, so that an average value of motor currents can be calculated without being affected by unreasonably low motor currents in certain conditions.

Also, influence of a large current that would not flow during a normal process but could possibly flow can be minimized.

According to the invention as set forth in claim 2, storage of motor current values that are to be effective data is performed only when the motor current is stable during the normal operation mode of the exhaust pump, and therefore, in addition to the effects of the invention as set forth in claim 1, a largest current that flows in the motor driver immediately after completion of the acceleration mode of pump operation can be ignored.

Thus the invention provides a characteristic effect that influence of unreasonably low motor currents such as those during waiting is avoided, since motor currents during waiting which do not exceed a preset value are not used as data for calculation of an average value.

According to the invention as set forth in claim 3, a largest motor current in each process can contribute to calculation of an average value, so that, in addition to the effects of the invention as set forth in claim 1 or 2, an average value of motor current values of all the processes can be calculated even more precisely.

According to the invention as set forth in claim 4, even though the speed and the like of product deposition may differ in each exhaust pump, the threshold is set in accordance with the deposition speed and the like of each exhaust pump, and it is determined whether or not the difference value between motor current values exceeds this threshold. Therefore, in addition to the effects of the invention as set forth in claim 1, 2, or 3, a time for maintenance of exhaust pump can be determined more precisely.

According to the invention as set forth in claim 5, an exhaust pump is provided, which is readily feasible without the burdens of installing equipment for flowing a gas, or adding or changing operation modes in apparatuses, and which can calculate an average value of motor currents precisely without being affected by unreasonably low motor currents in certain conditions such as during waiting.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7A is a diagram explaining the influence of motor currents during acceleration and deceleration on the linear approximations when the motor currents that are equal to or greater than a preset value X(A) are used;

FIG. 7B is a diagram for explaining how to calculate an average value and the like based on motor currents that are equal to or greater than a preset value X−1(A);

DETAILED DESCRIPTION

To achieve an object that is to provide a deposit detection device for a exhaust pump, which is readily feasible without the burdens of installing equipment for flowing a gas, or adding or changing operation modes in apparatuses, the present invention provides a deposit detection device for an exhaust pump that exhausts gas by a rotating action of a rotating body, including: a means for detecting motor current values a motor that rotates the rotating body; a current value storage portion that stores only motor current values equal to or greater than a preset value during a normal operation mode; an average value calculation portion that calculates an average value per unit time of the motor current values stored in the current value storage portion; an average value storage portion that stores the average value calculated by the average value calculation portion; an approximation calculation portion that chronologically order a storage current average values stored in the average value storage portion and determines a linear approximation; and a difference value calculation portion that determines a difference value between a predicted motor current value calculated by using the linear approximation and an initial motor current value at a start of use of the exhaust pump. A time when the difference value exceeds a predetermined threshold is determined as a time for maintenance of the exhaust pump.

Figure 14:
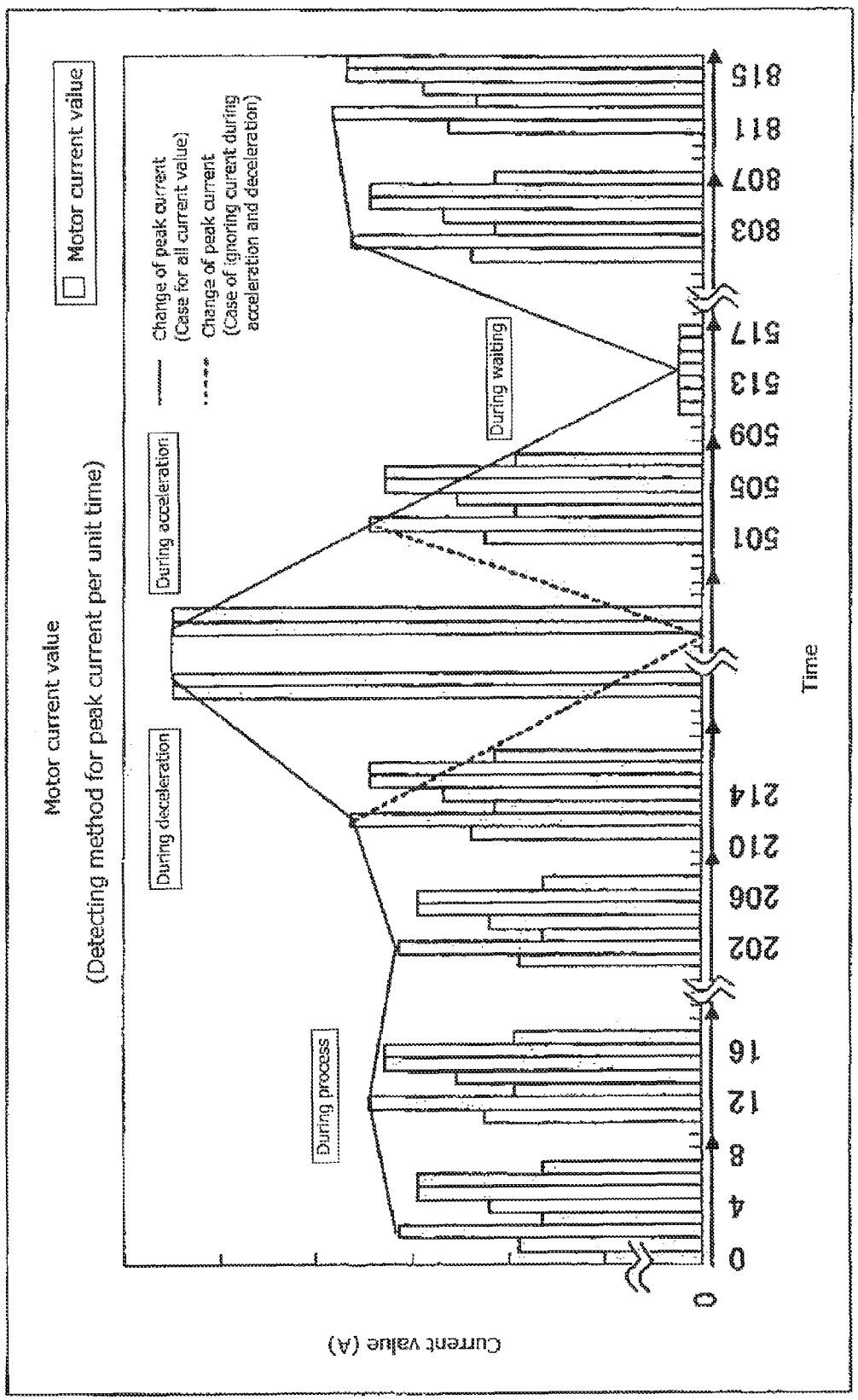
FIG. 14 is a diagram explaining a method wherein peak values of motor current per unit time are compared.

The following are three possible methods (comparative examples) of detecting changes in the motor current, but these methods each have difficulties and are impracticable. In a first method, for example, peak values of motor current per unit time may be compared as shown in FIG. 14.

With this method, however, since peak values of motor current are searched from a short period of time, if, for example, a waiting time during a pump operation (including no-load operation time) extends long, the peak values of motor current may be almost zero. The change in the peak values of motor current would then be very large, which is not suited to practical use.

Figure 15:
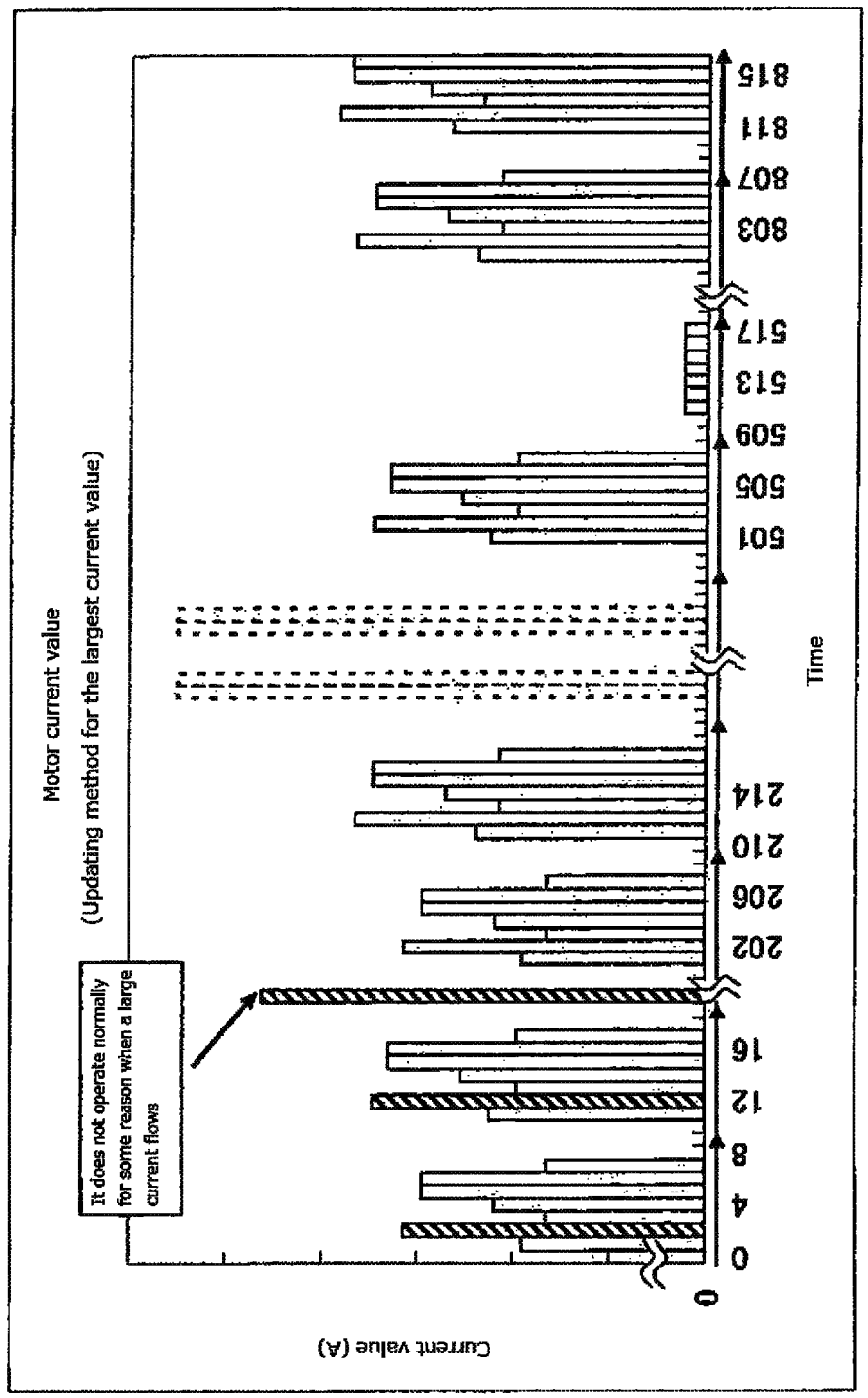
FIG. 15 is a diagram explaining a method wherein peak values of motor current are stored.

In a second possible method, as shown in FIG. 15, peak values of motor current may be stored. However, even if the peak values of motor current during acceleration and deceleration of the pump are ignored, if, for some unexpected reason a larger current than normal flows during the process in a normal operation mode, this value, that is higher than the motor current during normal operation, will be stored, in which case changes in the motor current cannot be detected correctly.

It is possible to combine these two methods. However, it is still difficult to precisely grasp the motor current because of the drawbacks of either the first or the second method.

Figure 3:
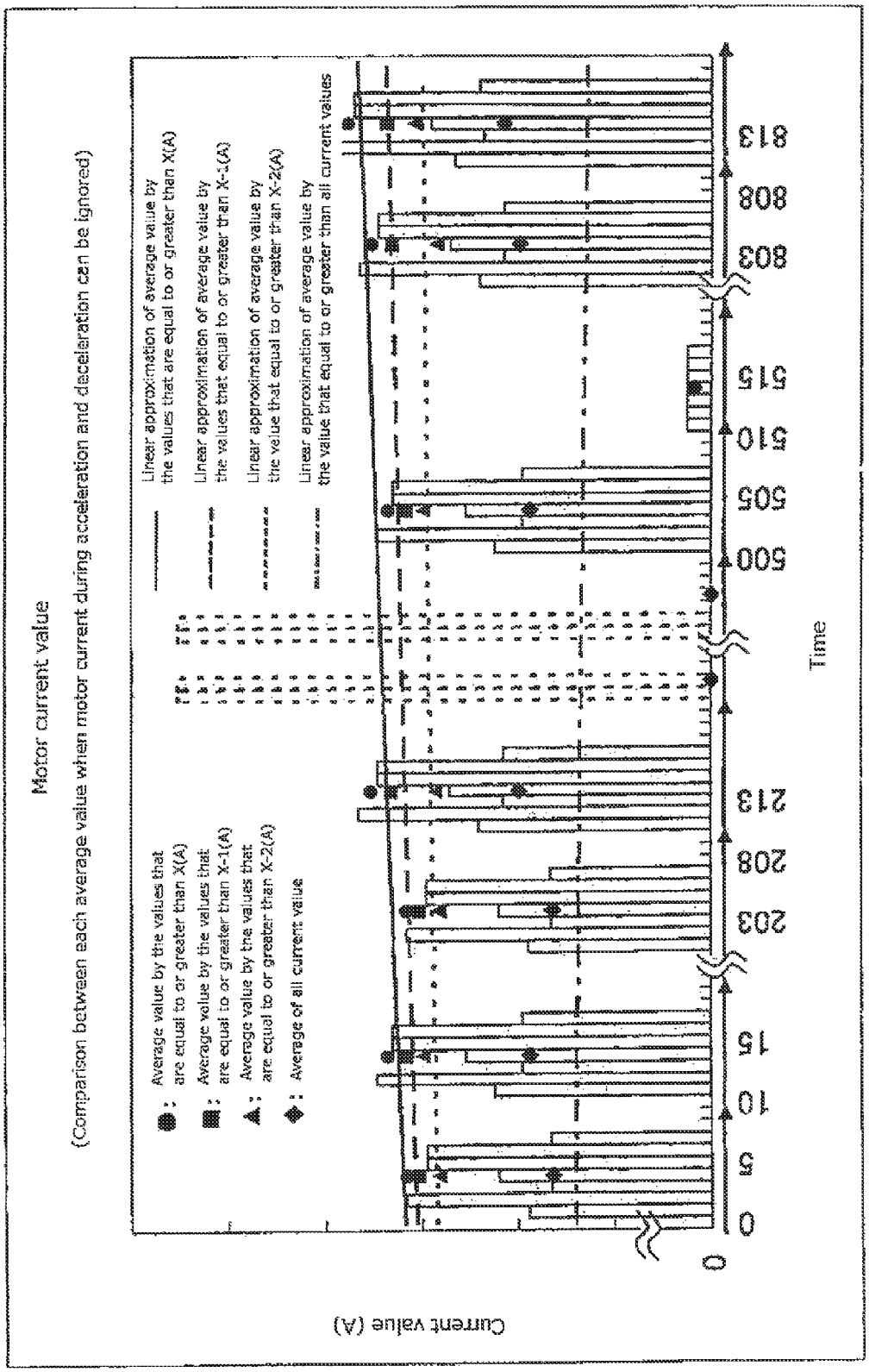
FIG. 3 is a diagram illustrating a comparison of linear approximations of motor currents that are equal to or greater than various different preset values.

Further, a third possible method would be to obtain an average of all the motor current values (see averages of all current values and the linear approximation indicated by one-dot chain line in FIG. 3). A problem in this case is that the motor current may sometimes be unreasonably small such as during a waiting time in pump operation, because of which correct determination of the state of product deposition is difficult.

The present invention eliminates the drawbacks of the methods of determining a change in the motor current (comparative examples) described above, and proposes a method whereby average values of motor currents are precisely calculated by adopting only motor currents that are equal to or greater than a preset value as effective data.

Namely, the method of calculating motor currents according to the present invention is a variation of the method of comparing motor currents per unit time, but the current values to be compared are only those that are equal to or greater than a preset value and adopted as effective data, so that average values are calculated in accordance with the state of product deposition.

In order to determine the motor current correctly, values of motor current flowing for a predetermined period of time immediately after completion of an acceleration mode (including when the motor is accelerated again after a drop in rpm due to a pumping load) are ignored, even though it flows during the normal operation mode.

The "predetermined period of time after completion of the acceleration mode" is a period of time for the motor current to settle down to a sufficiently small value, in consideration of the values of the current that flows immediately after the completion of the acceleration mode.

The following advantageous effects are achieved by using average values of motor currents equal to or greater than a preset value adopted in the operation mode as described above:

(1) If motor currents do not exceed a preset value during waiting time or the like of operation, these current values are not used for calculating an average value. Therefore, calculation of the average value is not affected even in a situation in which very little effective data of motor currents is available, such as during waiting time of the operation. Namely, this will have an improving effect on the method of obtaining an average of all current values mentioned above.

(2) Influence of a large current that would not flow during a normal process but could possibly flow can be minimized. Namely, this will have an improving effect on the method of storing a peak current value mentioned above.

Figure 10:
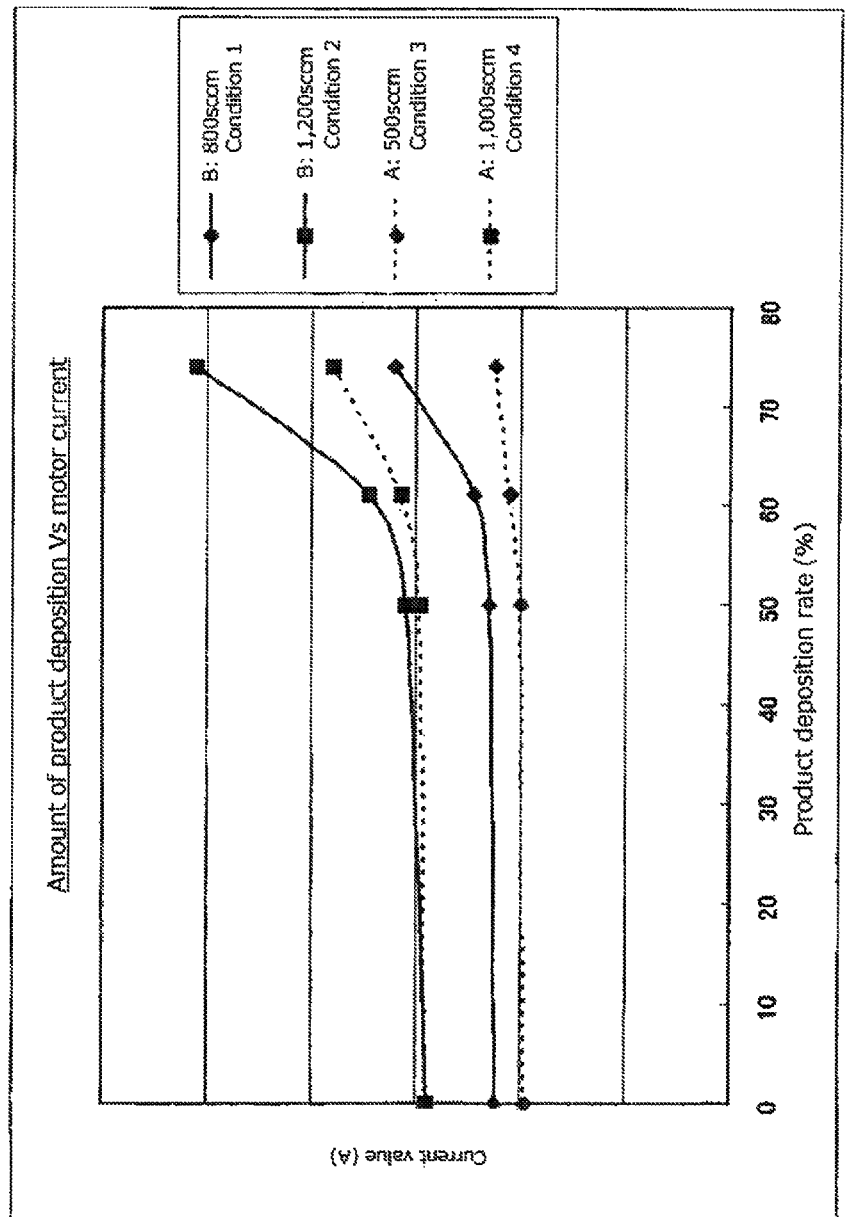
FIG. 10 is a diagram explaining a relationship between product deposition rate and motor current of the exhaust pump of FIG. 8 measured during operations under simulated conditions with deposits of FIG. 9.
Figure 11:
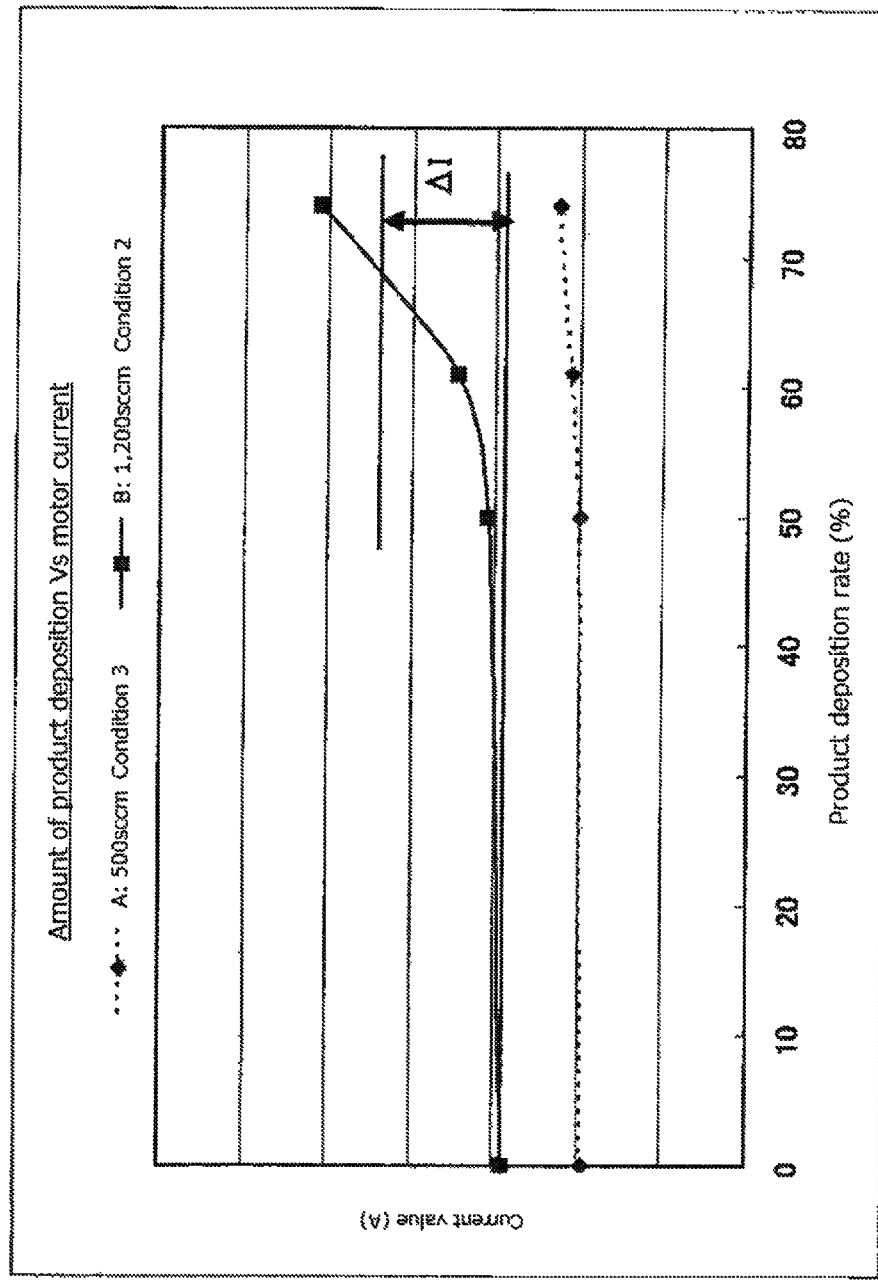
FIG. 11 is a diagram explaining a relationship between product deposition rate and motor current of the exhaust pump of FIG. 8 measured during operations under Conditions 2 and 3 of FIG. 10.
Figure 12:
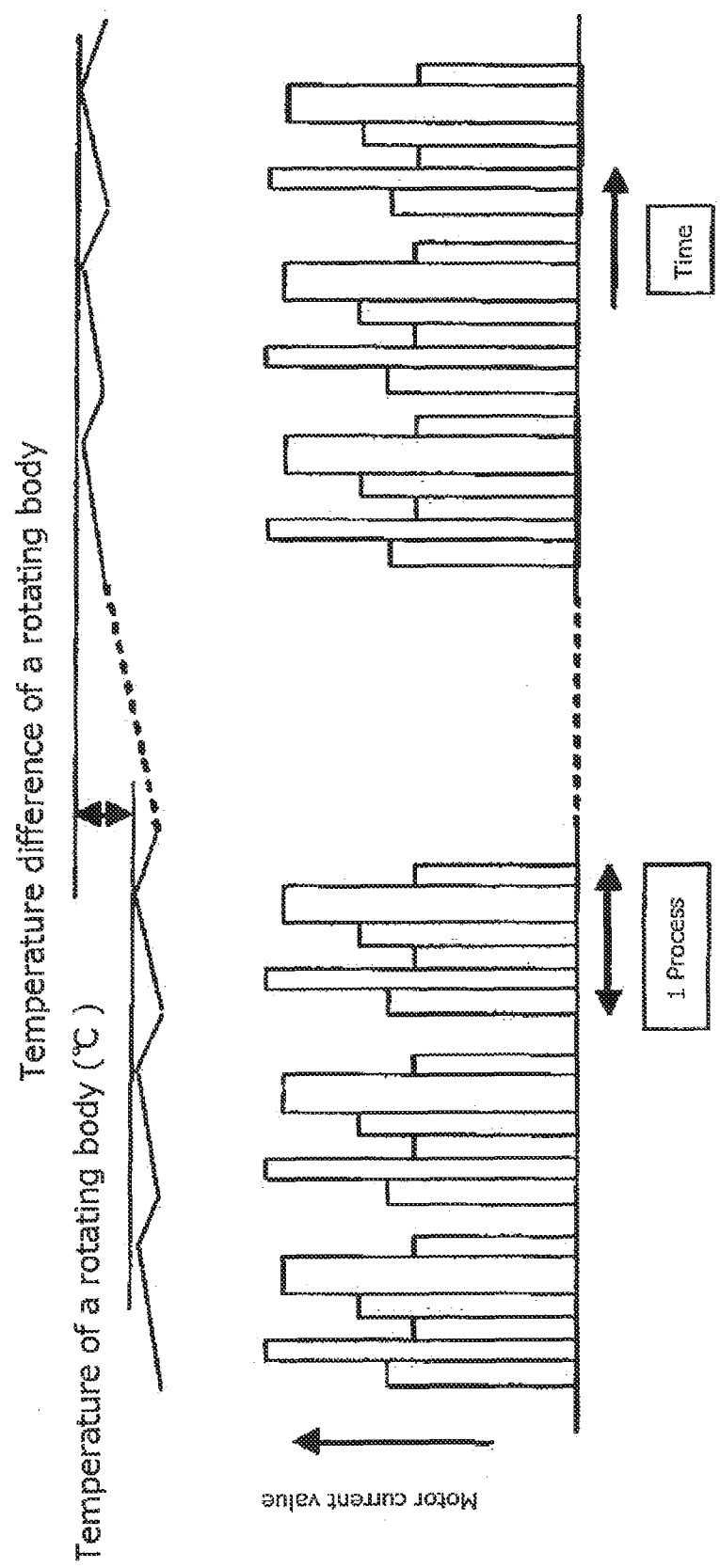
FIG. 12 is a diagram explaining and illustrating patterns of changes in the motor current of the exhaust pump during a process.
Figure 13:
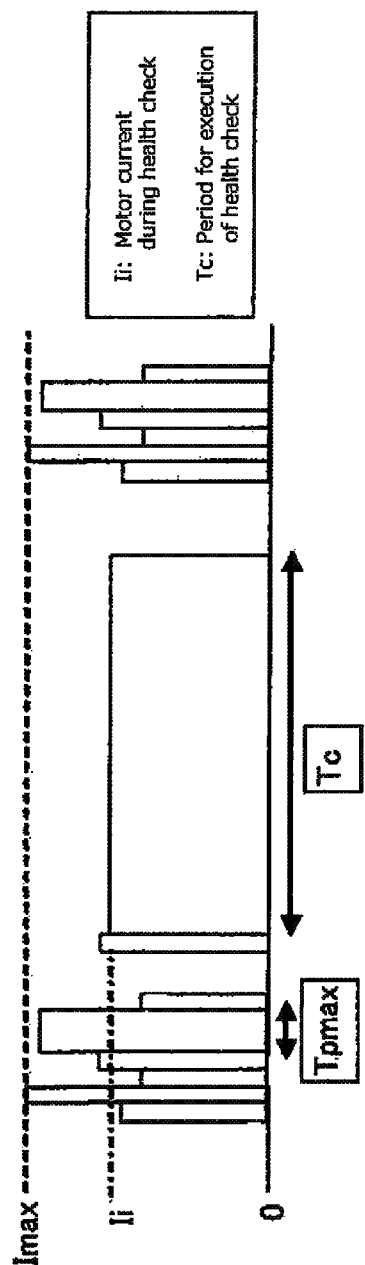
FIG. 13 is a diagram showing how the motor current changes during a process and during execution of a health check mode.

(3) The reference value for effective motor currents is set to at least a current with a magnitude that best reflects the state of product deposition as shown in FIG. 10. Thereby, a motor current data can be compared significantly, under a condition in which the change in motor current caused by product deposition is large.

Note, there need not necessarily be just one preset value of motor current, but in an alternative method, several values may be calculated at the same time, and one of them that best indicates changes in the motor current may be adopted. Alternatively, in another method, various preset values may be weighted in accordance with deposit detection conditions or environments, and one of them may be adopted.

(4) The algorithm for calculating the average value is simple, so that the burden of the end users is significantly reduced as compared to conventional counterparts.

EXAMPLES

Hereinafter, a preferred embodiment of the present invention will be described with reference to FIG. 1 to FIG. 7. Product deposition inside an exhaust pump is related to changes in the motor current of the exhaust pump, as already explained in the description of the background art.

Figure 8:
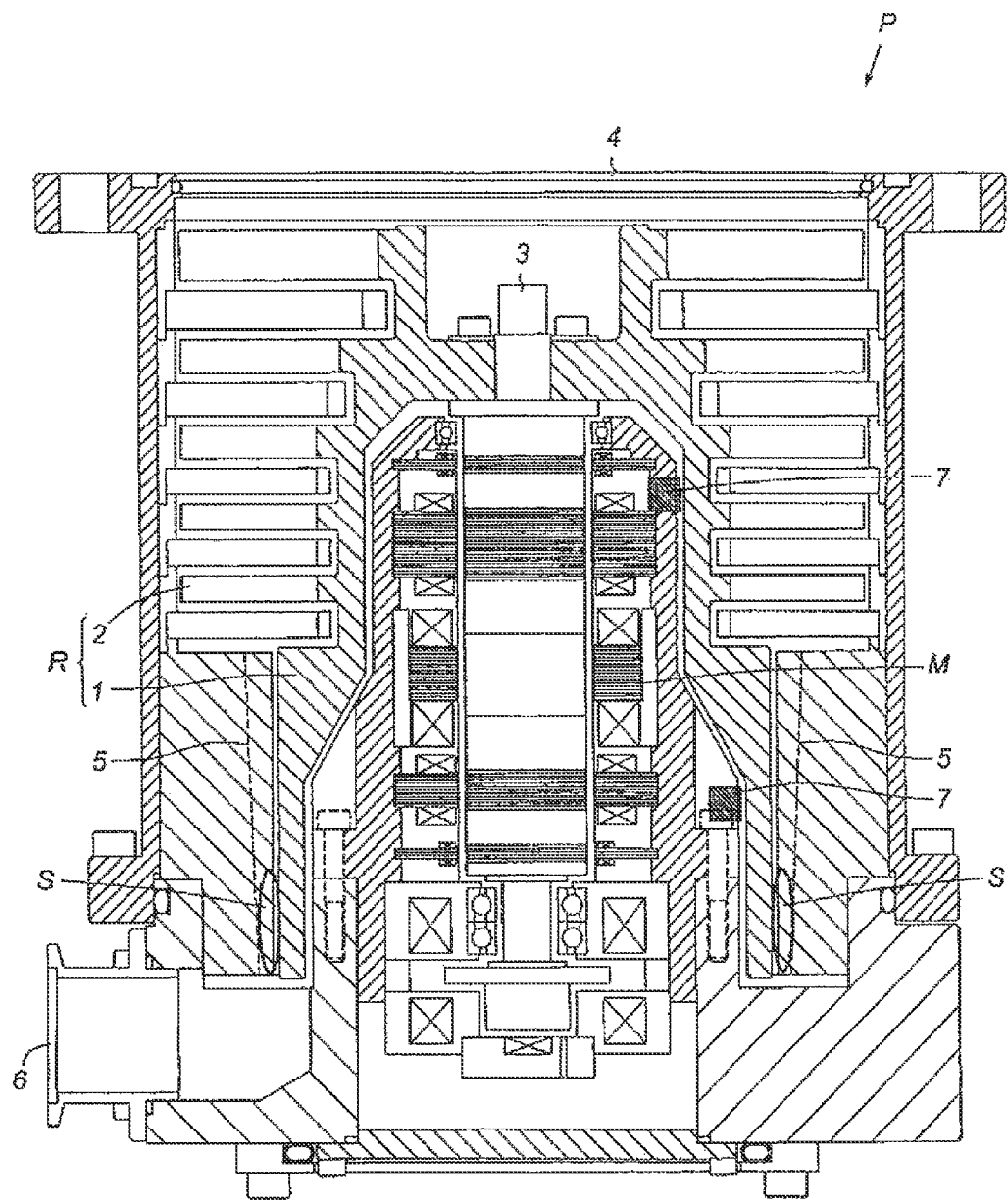
FIG. 8 is a cross-sectional view of one example of an exhaust pump.
Figure 9:
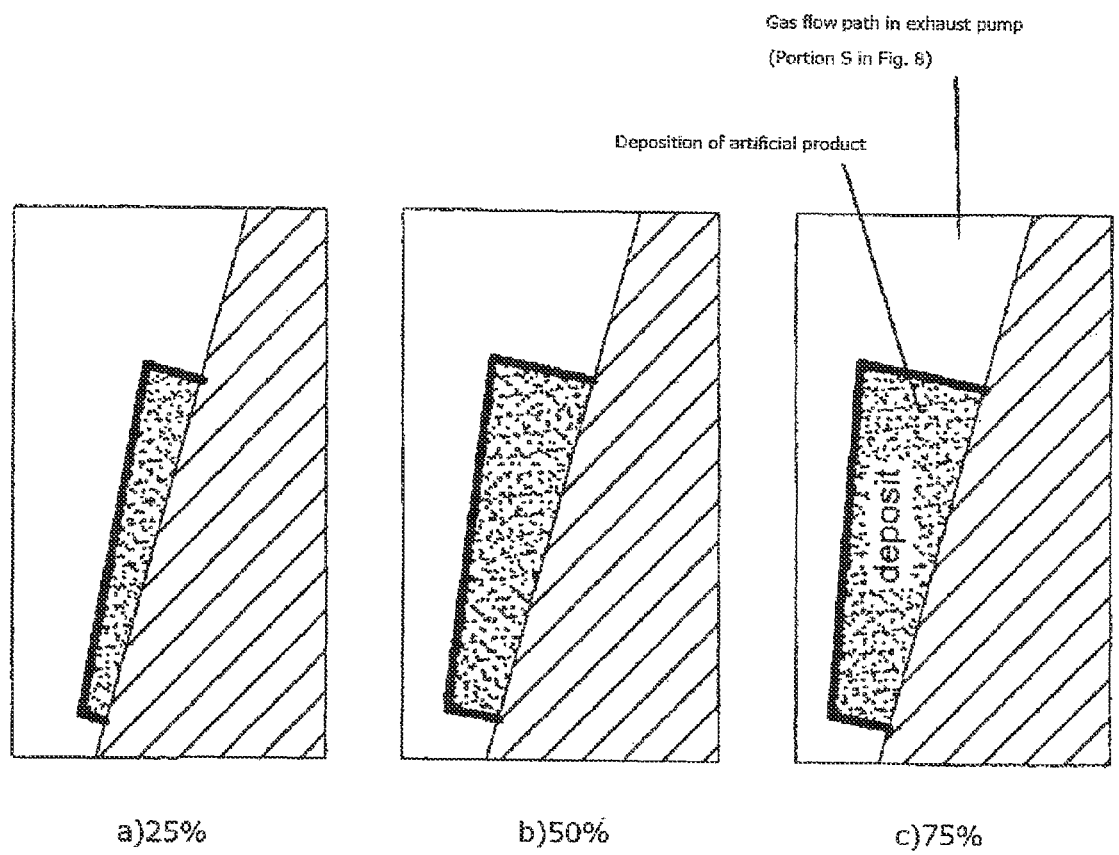
FIG. 9 is a diagram explaining simulated conditions of product deposition in a gas passage inside the exhaust pump of FIG. 8, FIG. 9A showing a condition with a product deposition rate of 25%, FIG. 9B showing a condition with a rate of 50%, and FIG. 9C showing a condition with a rate of 75%, respectively.

Namely, products deposit in a gas passage (part S) in a lower part of the cylindrical part 1, as shown in FIG. 8. As products deposit, pressure in a lowermost part of the exhaust pump P below the blade part 2 rises. This increases the load on the motor M, so that the motor current is controlled to increase.

In this system, a change in the motor current is used as a means for detecting a degree of product deposition. It is therefore presupposed that there is no change in the gas load pattern during processing by an end user. If the same type of gas flows through the exhaust pump at a constant flow rate, the motor current increases in proportion to an increase in the degree of product deposition, as shown in FIG. 10.

In practice, a consistent pattern of gas loads on the exhaust pump is crucial, rather than the type and flow rate of the gas flowing through the exhaust pump.

Figure 1:
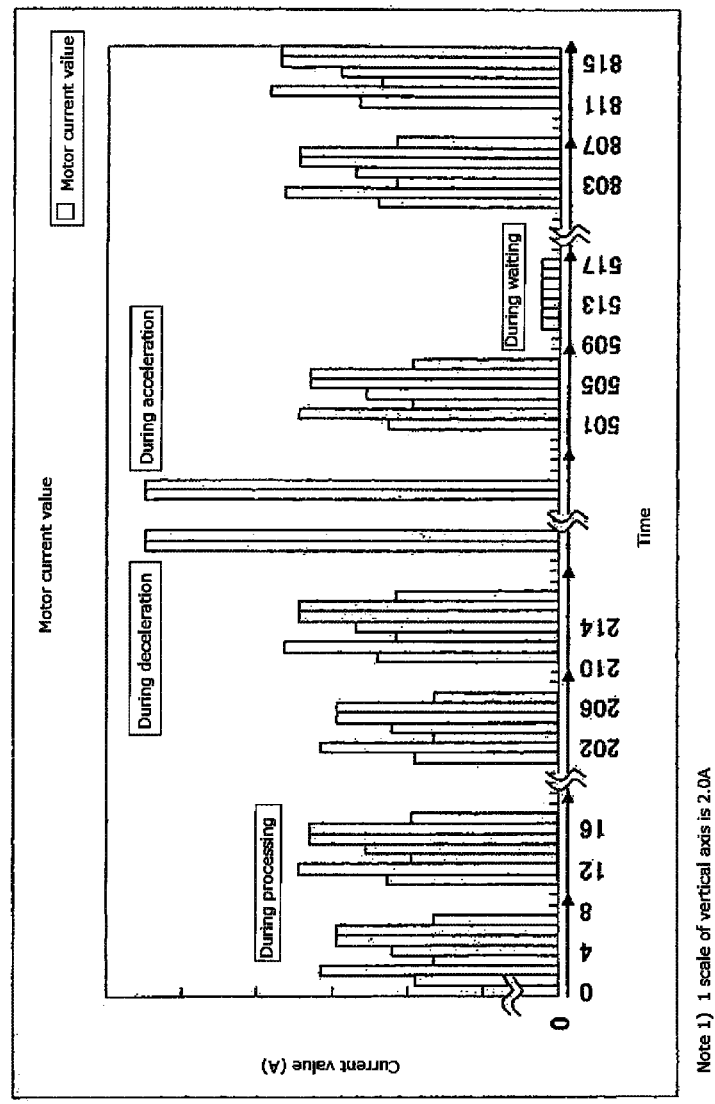
FIG. 1 is a diagram for explaining changes in motor current during a process.

Let us consider changes in the motor current during a process shown in FIG. 1, for example. Even if there are no changes in end user's settings of gas type and gas flow rate, the motor current is expected to change slightly every time for various reasons such as the temperature of the pump, or the temperature and flow rate of the gas, in a short term. In a long term, the motor current increases gradually in accordance with the state of product deposition.

The pump is not constantly subjected to load; for example, there would be a condition when there is no load at all inbetween processes, i.e., when no current flows in the motor, and there would be a waiting time when a very small current flows. Further, a largest possible current that the motor driver is capable of applying may flow during acceleration of deceleration of pump operation.

If the motor is accelerated or decelerated during monitoring of the motor current, its peak current value would be a current rating of the motor driver. Therefore, an operation whereby the motor currents during acceleration and deceleration will be ignored is necessary first.

The exhaust pump according to the present invention has four operation modes: Levitation, Acceleration, Normal Operation, and Brake. The end user carries out processing only during the normal operation mode.

Figure 16:
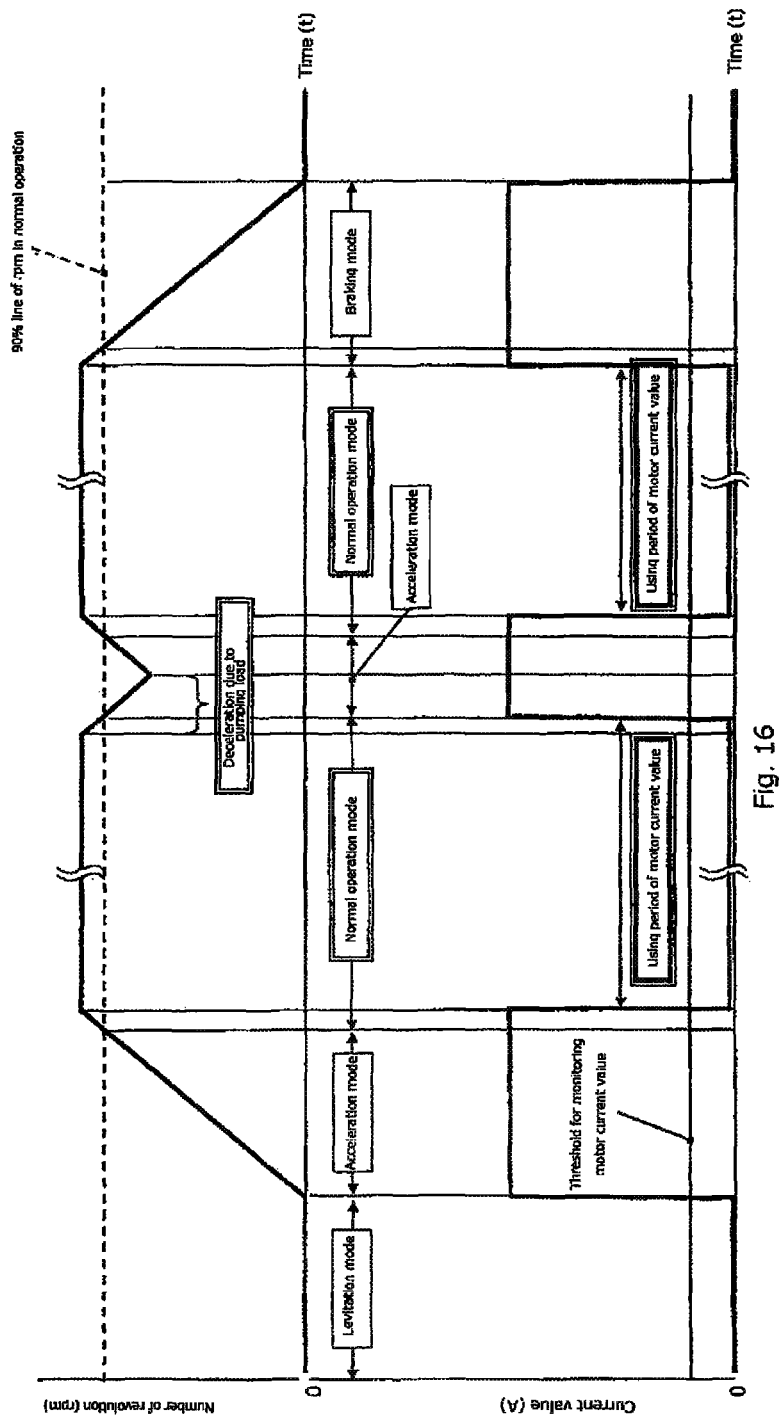
FIG. 16 is a diagram explaining pump operation modes in which motor current is detected.

However, sometimes, about 90% of motor's rated RPM is achieved during the acceleration mode, and so a maximum current keeps flowing immediately after the acceleration mode until the rated RPM is reached. Also, if the motor speed is reduced to 90% or lower of rated RPM because of braking or pumping load and then accelerated again, a maximum current keeps flowing until the rated RPM is reached just like immediately after acceleration (see FIG. 16).

According to the present invention, therefore, in monitoring the motor current, it is checked if the motor current has once dropped to a sufficiently small value, for the purpose of ignoring current values during the normal operation mode immediately after the acceleration mode (including when the motor is accelerated again after the rpm has dropped due to pumping load), and the current values after that are used for the monitoring purpose.

Monitoring of the motor current during the normal operation mode should preferably be started after the current once drops at least to ½ or less of a maximum current value that flows after the completion of the acceleration mode, based on a relationship between product deposition and changes in the motor current.

Figure 2:
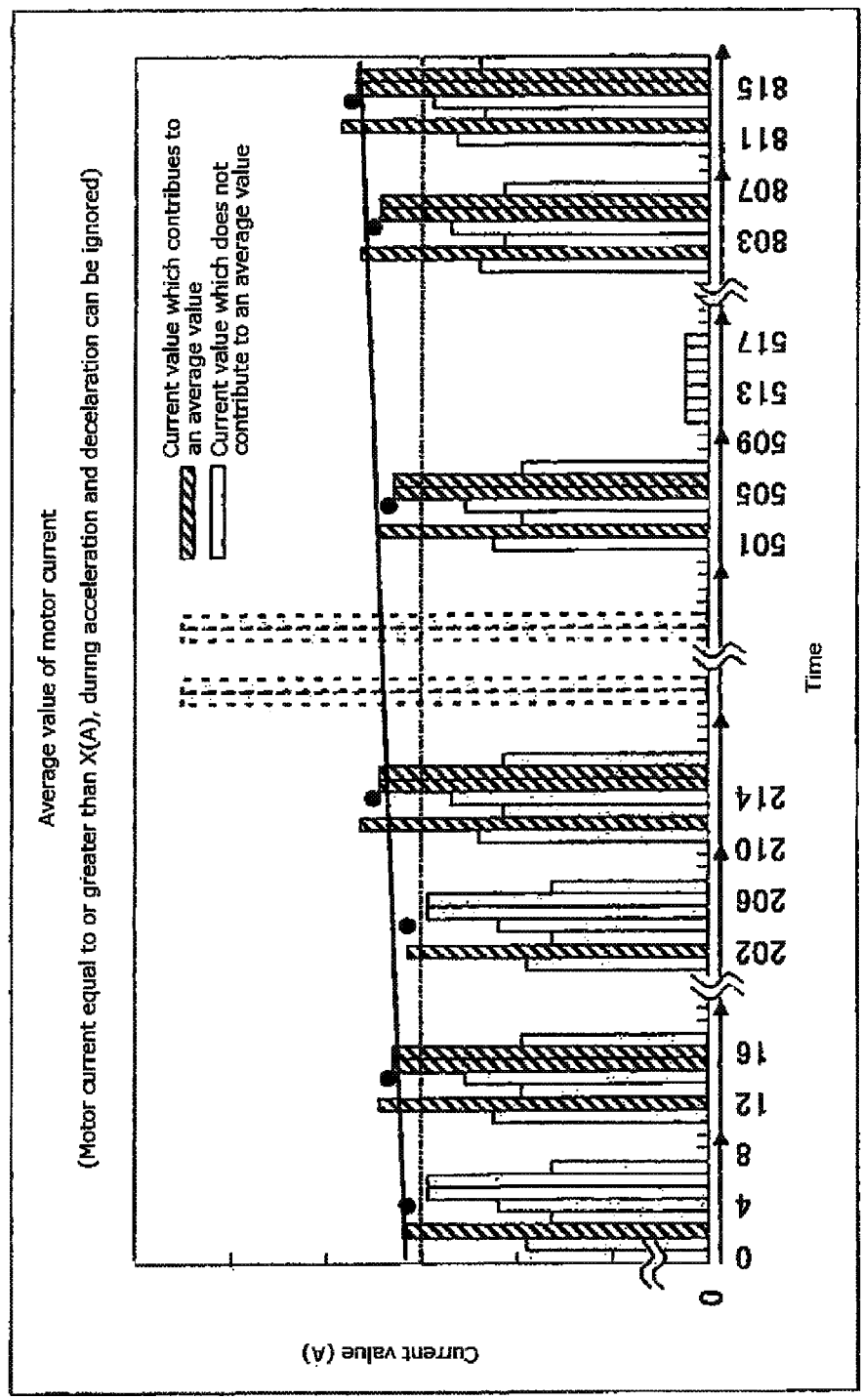
FIG. 2 is a diagram for explaining how to calculate an average value and the like based on motor currents that are equal to or greater than a preset value according to the present invention.

In a specific example shown in FIG. 2, a value X(A) of motor current is preset as a reference for effective data, and the motor current is stored only if it is higher than this preset value X(A). There need not necessarily be just one preset value of motor current, but several values may be calculated and used at the same time, and one of them that indicates changes in the motor current most clearly may be adopted (see FIG. 3).

An average value per unit time of the stored current values is calculated for each process, which is successively stored. It is sufficient to store the average value once or twice per day, for example, but it may be stored in any other intervals.

The plurality of stored average values are then chronologically plotted, and a linear approximation of these average values is determined. Using a linear approximation (time being the dependent variable) calculated from the average values at the start of use of the pump (during a process executed immediately after an actual end user of the exhaust pump incorporated the exhaust pump in a processing apparatus), a difference value of a predicted current value at a time in future is calculated. A time when the calculated difference value of the motor current exceeds a threshold that is preliminarily set based on the state of product deposition is determined, and that time is determined as the time for maintenance of the exhaust pump.

The linear approximation (first-order approximation) can in principle be determined by a least squares method, for example. Any known software that can calculate first-order approximations (using functions, analytical tools, graph drawing functions, and so on) may be used.

SPECIFIC EXAMPLES OF EMBODIMENT

Figure 4:
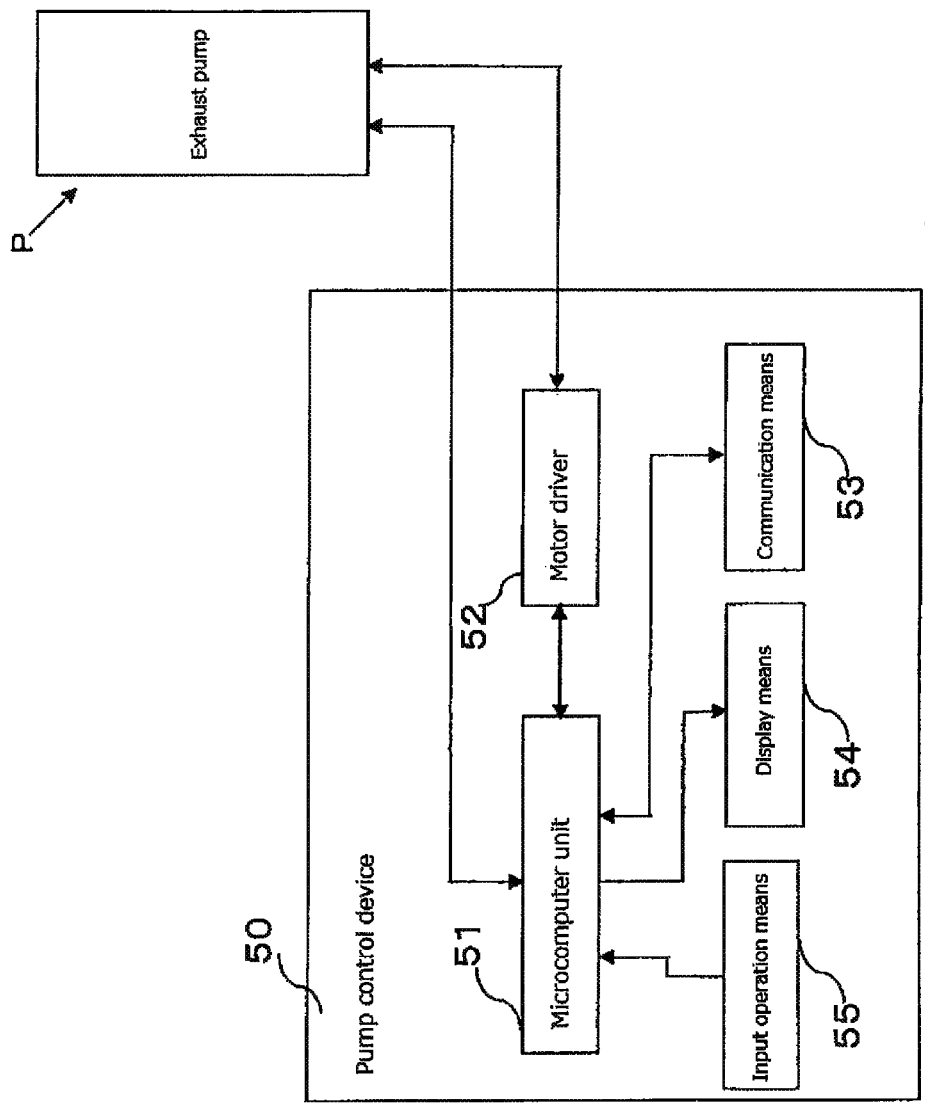
FIG. 4 is a functional block diagram of one example in which a deposit detection device according to one embodiment of the present invention is incorporated in a pump control device for the exhaust pump of FIG. 8.

FIG. 4 is a functional block diagram of one example of embodiment in which a deposit detection device according to the present invention is incorporated in a pump control device for the exhaust pump of FIG. 8.

The pump control device 50 of FIG. 4 includes a microcomputer portion 51 for overall control of the exhaust pump P, a motor driver 52 that drives the motor M of the exhaust pump P, a communication means 53 that perform communication with external devices such as a client device including a client's processing apparatus (not shown) based on an instruction from the microcomputer portion 51, display a means 54 that display an operating status and the like of the exhaust pump P based on an instruction from the microcomputer portion 51, and an input operation means 55 for inputting setting values or the like to the microcomputer portion 51. The motor driver 52 also functions as a means for detecting a current value of the motor M.

Figure 5:
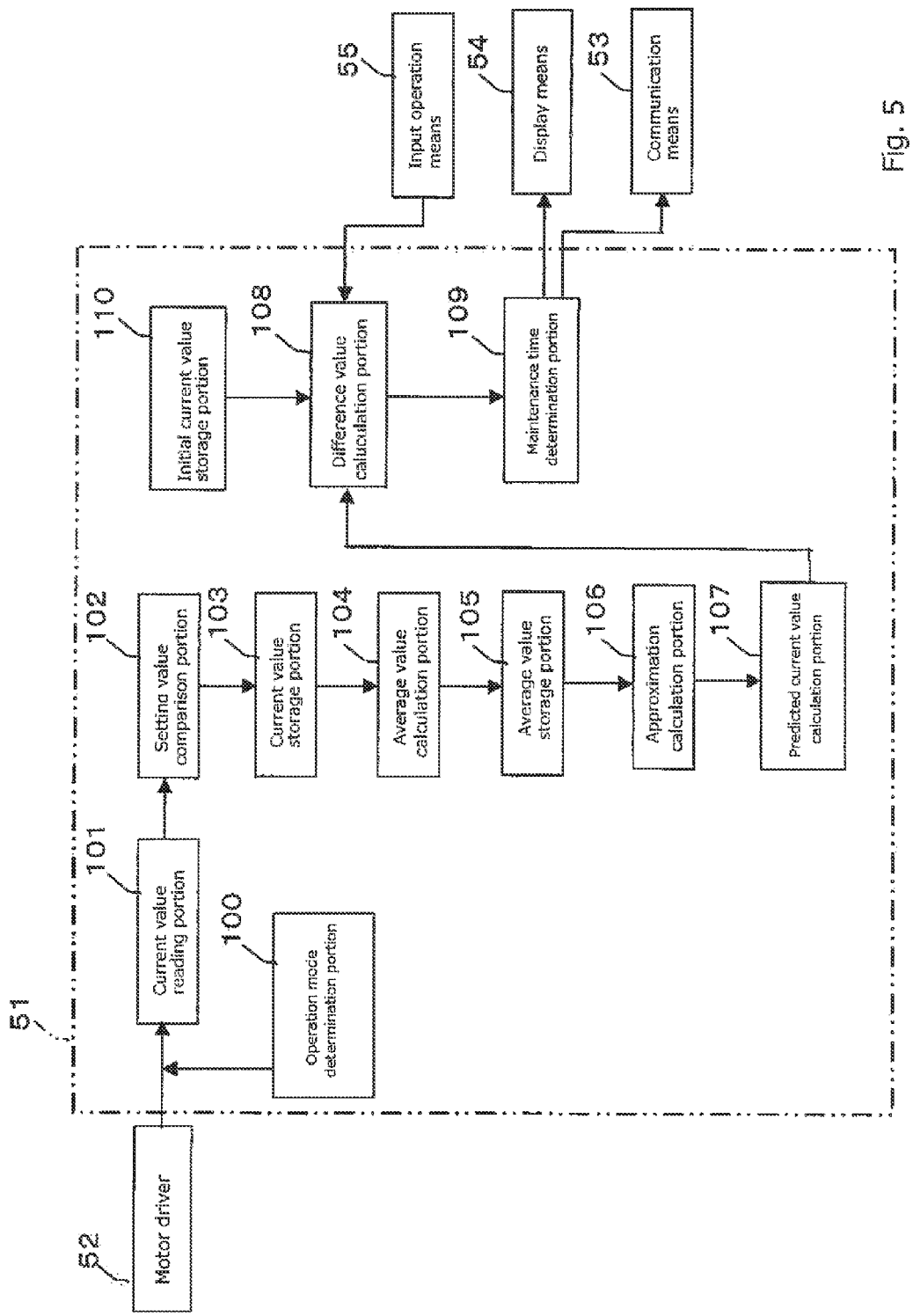
FIG. 5 is a block diagram illustrating an example of internal configuration of a microcomputer portion according to the present invention.

The microcomputer portion 51 includes an operation mode determination portion 100, a current value reading portion 101, a setting value comparison portion 102, a current value storage portion 103, an average value calculation portion 104, and an average value storage portion 105, as shown in FIG. 5.

The operation mode determination portion 100 determines whether or not the operation mode of the exhaust pump P is the normal operation mode (excluding a predetermined period immediately after completion of the acceleration mode). The current value reading portion 101 reads in current values of the motor driving the rotating body R mentioned above during the normal operation mode.

The setting value comparison portion 102 compares the current value with a preset value X(A), and determines whether or not the current value is equal to or greater than the preset value (A). The current value storage portion 103 stores data of only current values that are equal to or greater than the preset value (A).

The average value calculation portion 104 calculates an average value per unit time of the current values that are equal to or greater than the preset value (A). The average value storage portion 105 successively stores average values calculated per unit time.

The current value storage portion 103 and the average value storage portion 105 may be, for example, a storage area secured in a portion of a nonvolatile storage medium (not shown) incorporated in the microcomputer portion 51 to store data such as motor currents, or may be configured in any other forms.

The microcomputer portion 51 includes an approximation calculation portion 106, a predicted current value calculation portion 107, and a difference value calculation portion 108. The approximation calculation portion 106 determines a linear approximation of a plurality of chronologically plotted average values of motor currents.

The predicted current value calculation portion 107 calculates a motor current value (predicted current value) using the linear approximation. The difference value calculation portion 108 determines a difference value between the calculated predicted current value and a current value (initial current value) at the start of use of the exhaust pump P (during a process executed immediately after an actual end user of the exhaust pump incorporated the exhaust pump in the processing apparatus). Reference numeral 110 in FIG. 5 represents an initial current value storage portion that stores the initial current value.

The microcomputer portion 51 further includes a maintenance time determination portion 109, which determines a time when the difference value will exceed a preliminarily set threshold (preset value) S, and decides that this time is the time for maintenance of the exhaust pump P.

The threshold S to be compared with the difference value between changed motor currents shall be separately set for each exhaust pump P based on a checked status of product deposition, since the speed of product deposition may differ in each exhaust pump P. There are two ways of setting the threshold S. The first method is to directly set a difference S from the initial current value, based on which the time for maintenance is determined through the comparison process mentioned above. The second method is to set a specific current value for determination of the time for maintenance. In this case, this value is directly compared with a predicted current value to determine the time for maintenance.

Figure 6:
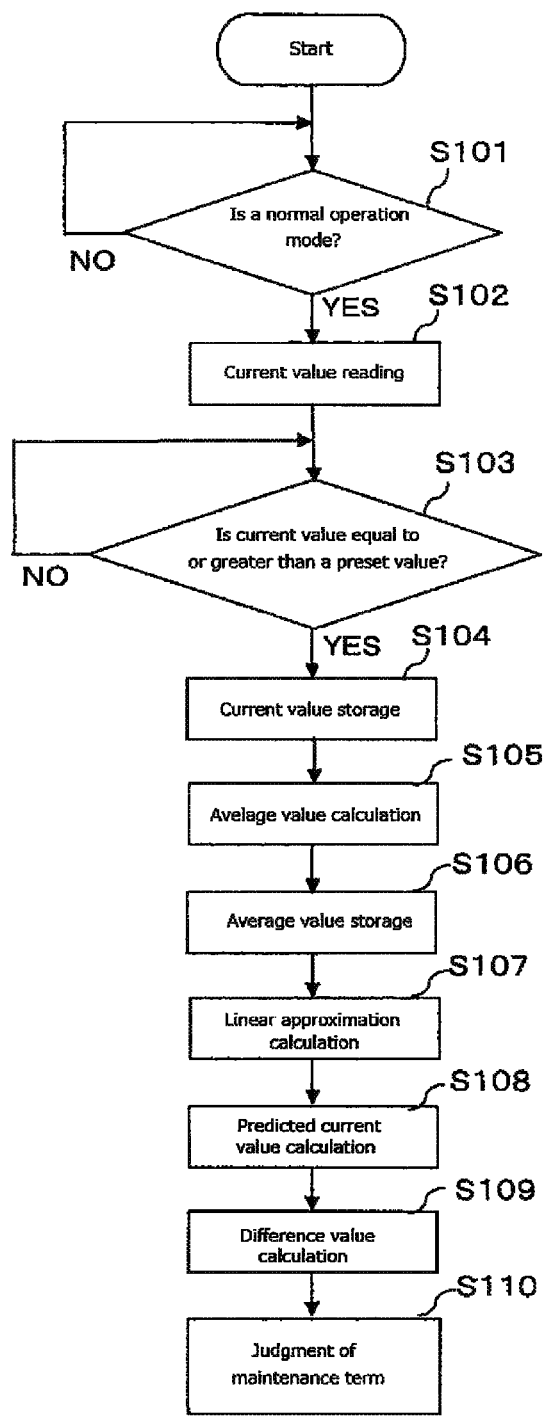
FIG. 6 is a flowchart showing one example of operation process steps of the deposit detection device according to the present invention.

In this embodiment, the process steps of the flowchart shown in FIG. 6 are carried out. First, at step S101, the operation mode determination portion 100 determines whether or not the operation mode of the exhaust pump P is the normal operation mode (excluding a predetermined period immediately after completion of the acceleration mode). Only when the mode is the normal operation mode, the current values of the motor driving the rotating body R are read in by the current value reading portion 101 at step S102.

In this embodiment, the following process steps are performed based on the current values that are, as described above, read in only after the current in the motor M has stabilized, i.e., during the normal operation mode, and after it has been confirmed that the current has once reached almost zero immediately after completion of the acceleration mode (including when the motor is accelerated again after the brake mode).

At step S103, the setting value comparison portion 102 compares a read-in motor current with a preset value X(A), and determines whether or not the motor current is equal to or greater than the preset value X(A). Motor currents, if they are equal to or greater than the preset value X(A), are successively stored in the current value storage portion 103 at step S104.

In this system, motor currents detected by the motor driver 52 are read into a buffer, and only effective data of these read-in motor currents that are equal to or greater than the preset value X(A) are picked up and stored in a storage area.

Next, at step S105, the average value calculation portion 104 calculates an average value per unit time of the motor currents that are equal to or greater than the preset value X(A). At step S106, the calculated average values are successively stored in the average value storage portion 105.

After that, at step S107, the plurality of average values of motor currents are chronologically ordered, and a linear approximation of these average values is determined by the approximation calculation portion 106. At step S108, the predicted current value calculation portion 107 calculates a predicted motor current by using the obtained linear approximation.

At step S109, the difference value calculation portion 108 determines a difference value between the calculated predicted current and a motor current at the start of use of the exhaust pump P (initial current value).

At step S110, the maintenance time determination portion 109 compares the obtained difference value with a predetermined threshold S, which is a value S preliminarily set in accordance with the state of product deposition. The maintenance time determination portion determines a time when the difference value exceeds the threshold S, and estimates that this time is the time for maintenance of the exhaust pump P.

The estimated time for maintenance may be output to an external device via a communication means 53, or displayed by a display means 54, or processed otherwise.

In this embodiment, if the preset value of motor current is set to the magnitude of X(A), the linear approximation shifts upward when currents during acceleration and deceleration are take into account as shown in FIG. 7A, as compared to when these currents are not taken into account. Changing the preset value of motor current from the magnitude of X(A) to X−1(A) increases the amount of data that can contribute to calculation of average values, so that the linear approximation shifts slightly downward as shown in FIG. 7B.

In this embodiment, the threshold for the difference value between motor currents is separately determined in consideration of the state of product deposition in each exhaust pump. Thus, even though the speed and the like of product deposition may differ in each exhaust pump, the threshold (preset value) is set in accordance with the deposition speed and the like, and it is determined whether or not the difference value between motor currents exceeds this threshold. Therefore, the time for maintenance of exhaust pump can be more precisely determined.

As described above, according to the present invention, a difference value between a current value calculated from a linear approximation of average values of motor currents equal to or greater than a preset value, and a motor current at the start of use of the exhaust pump, is determined, and a time when this difference value exceeds the preset value is determined as a time for maintenance of the exhaust pump.

In this way, it is possible to determine the state of product deposition inside an exhaust pump to know the time for maintenance of the exhaust pump without the burdens of installing equipment for flowing a gas, or adding or changing operation modes in apparatuses. The time for maintenance can readily be determined only by determining a linear approximation of average values of motor currents equal to or greater than a preset value.

Thereby, in particular, influence of a large current that would not flow during a normal process but could possibly flow can be minimized. The invention is advantageous in that it uses a simple algorithm for calculating average values.

Further, data is collected from a time period excluding a period of time for the motor current to drop to approximately zero, since the motor currents immediately after completion of the acceleration mode (including when the motor is accelerated again immediately after the brake mode) are not effective data. Thereby, storage of motor currents that are to be effective data is performed only when the motor current is stable during the normal operation mode of the exhaust pump.

Therefore, currents that flow during waiting, and a largest current that flows in the motor driver during acceleration and deceleration of pump operation can be ignored. That is, currents that flow during waiting, and a largest current that flows in the motor driver during acceleration and deceleration can be ignored.

Motor currents during waiting which do not exceed a preset value are not used as data for calculation of an average value, which provides the merit that influence of unreasonably low motor currents such as those during waiting is avoided.

Also, influence of a large current that would not flow during a normal process but could possibly flow can be minimized. Even though the speed of product deposition may differ in each exhaust pump that will be the detection target, the difference value between motor currents can be calculated in accordance with characteristics of deposition in each exhaust pump.

Therefore, a preset value of motor current can be set appropriately to best reflect the state of product deposition, which allows a difference value to be obtained based on a large change in the motor current caused by product deposition, i.e., to be calculated more precisely.

It will be appreciated that the present invention can be variously modified without departing from the spirit of the present invention and that such modifications are also considered part of the present invention. For example, the magnetic bearing of the turbomolecular pump may not necessarily be controlled in five axes, but may be controlled in three axes.

EXPLANATION OF REFERENCE NUMERALS

P: Exhaust pump
M: Motor
R: Rotating body
1: Cylindrical part
2: Blade part
3: Rotor shaft
4: Inlet port of exhaust pump
5: Threaded part
6: Outlet port of exhaust pump
50: Pump control device
51: Microcomputer portion
52: Motor driver (a means for detecting motor current)
100: Operation mode determination portion
101: Current value reading portion
102: Setting value comparison portion
103: Current value storage portion
104: Average value calculation portion
105: Average value storage portion
106: Approximation calculation portion
107: Predicted current value calculation portion
108: Difference value calculation portion
109: Maintenance time determination portion
110: Initial current value storage portion Various embodiments of the invention have been described. These and other embodiments are within the scope of the following claims.

What is claimed is:

1. A deposit detection device for an exhaust pump that exhausts gas by a rotating action of a rotating body, comprising:
a motor drive configured to detect motor current values of a motor that rotates the rotating body;
a microcomputer comprising:
a current value reading portion configured to read in the motor current values during a normal operation mode;
a current value storage portion configured to store only the motor current values that are equal to or greater than a preset value from among the motor current values during the normal operation mode;
an average value calculation portion configured to calculate an average value per unit time of the motor current values that are equal to or greater than the preset value and are stored in the current value storage portion;
an average value storage portion configured to store the average value calculated by the average value calculation portion;
an approximation calculation portion configured to chronologically order the average values stored in the average value storage portion and determine a linear approximation based on the chronologically ordered average values;
a difference value calculation portion configured to determine a difference value between a predicted motor current value calculated using the linear approximation and an initial motor current value at a start of use of the exhaust pump; and
a maintenance time determination portion configured to determine a time when the difference value exceeds a predetermined threshold as a time for maintenance of the exhaust pump, wherein the microcomputer is configured to change the preset value in accordance with deposition speed.

2. The deposit detection device for an exhaust pump according to claim 1, wherein the motor drive is configured to detect the motor current values in the normal operation mode except during a period in which the motor current values once drop to sufficiently small values after completion of an acceleration mode of the exhaust pump.

3. The deposit detection device for an exhaust pump according to claim 1, wherein the preset value of the motor current values is the largest possible value in a range that at least one data including a maximum value (peak current value) of the motor current values can be acquired in each process of exhausting the gas.

4. The deposit detection device for an exhaust pump according to claim 1, wherein the preset value of the motor current values is determined in accordance with a state of product deposition in the exhaust pump.

5. The deposit detection device for an exhaust pump according to claim 1, wherein the current value reading portion is configured to not read in the motor current values during acceleration, deceleration, for a predetermined period of time after completion of an acceleration and for a predetermined period of time after completion of a deceleration.

6. A exhaust pump comprising:
a rotating body that exhausts gas by a rotating action of the rotating body; and
a deposit detection device comprising:
a motor drive configured to detect motor current values of a motor that rotates the rotating body;
a microcomputer comprising:
a current value reading portion configured to read in the motor current values during a normal operation mode;
a current value storage portion configured to store only the motor current values that are equal to or greater than a preset value from among the motor current values during the normal operation mode;
an average value calculation portion configured to calculate an average value per unit time of the motor current values that are equal to or greater than the preset value and are stored in the current value storage portion;
an average value storage portion configured to store the average value calculated by the average value calculation portion;
an approximation calculation portion configured to chronologically order the average values stored in the average value storage portion and determine a linear approximation based on the chronologically ordered average values;
a difference value calculation portion configured to determine a difference value between a predicted motor current value calculated using the linear approximation and an initial motor current value at a start of use of the exhaust pump; and
a maintenance time determination portion configured to determine a time when the difference value exceeds a predetermined threshold is determined as a time for maintenance of the exhaust pump, wherein the microcomputer is configured to change the preset value in accordance with deposition speed.

7. The exhaust pump according to claim 6, wherein the motor drive is configured to detect the motor current values in the normal operation mode except during a period in which the motor current values once drop to sufficiently small values after completion of an acceleration mode of the exhaust pump.

8. The exhaust pump according to claim 6, wherein the preset value of the motor current values is the largest possible value in a range that at least one data including a maximum value (peak current value) of the motor current values can be acquired in each process of exhausting the gas.

9. The exhaust pump according to claim 6, wherein the preset value of the motor current values is determined in accordance with a state of product deposition in the exhaust pump.

10. A method comprising:
- detecting, by a motor drive of a deposit detection device for an exhaust pump that exhausts gas by a rotating action of a rotating body, motor current values of a motor that rotates the rotating body;
- reading, by a current value reading portion of a microcomputer of the deposit detection device, the motor current values during a normal operation mode;
- storing, by a current value storage portion of the microcomputer, only the motor current values that are equal to or greater than a preset value from among the motor current values during the normal operation mode;
- calculating, by an average value calculation portion of the microcomputer, an average value per unit time of the motor current values that are equal to or greater than a preset value and are stored in the current value storage portion;
- storing, by an average value storage portion of the microcomputer, the average value calculated by the average value calculation portion;
- chronologically ordering, by an approximation calculation portion of the microcomputer, the average values stored in the average value storage portion
- determining, by the approximate calculation portion of the microcomputer, a linear approximation based on the chronologically ordered average values;
- determining, by a difference value calculation portion of the microcomputer, a difference value between a predicted motor current value calculated using the linear approximation and an initial motor current value at a start of use of the exhaust pump; and
- determining, by a maintenance time determination portion of the microcomputer, a time for maintenance of the exhaust pump in response to the difference value exceeding a predetermined threshold, wherein the microcomputer is configured to change the preset value in accordance with deposition speed.

* * * * *